United States Patent [19]

Wilkinson

[11] Patent Number: 5,364,581
[45] Date of Patent: Nov. 15, 1994

[54] PROCESS OF MAKING POLYACRYLONITRILE FIBERS

[76] Inventor: Kenneth Wilkinson, 1010 Glenwood Blvd., Waynesboro, Va. 22980

[21] Appl. No.: 57,470

[22] Filed: May 6, 1993

[51] Int. Cl.$^5$ ............................ D01D 5/06; D01F 6/18
[52] U.S. Cl. ..................................... 264/182; 264/184; 264/211; 264/211.16; 526/94; 526/224; 526/227; 526/229; 526/230; 526/317.1; 526/318.3; 526/341
[58] Field of Search ................ 264/29.2, 182, 184, 264/211, 211.16; 526/94, 224, 227, 229, 230, 317.1, 318.3, 341

[56] References Cited

U.S. PATENT DOCUMENTS

| | | | |
|---|---|---|---|
| 3,917,776 | 11/1975 | Sato et al. | 423/447.5 |
| 3,920,605 | 11/1975 | Sato et al. | 524/701 |
| 4,009,150 | 2/1977 | Norling | 526/141 |
| 4,049,605 | 9/1977 | Kobashi et al. | 524/827 |
| 4,062,857 | 12/1977 | Kobashi et al. | 524/831 |
| 4,126,652 | 11/1978 | Oohara et al. | 264/29.6 |
| 4,201,740 | 5/1980 | Hurley | 264/38 |
| 4,267,103 | 5/1981 | Cohen | 524/773 |
| 4,452,860 | 6/1984 | Obama et al. | 428/367 |
| 5,051,216 | 9/1991 | Nakatani et al. | 264/29.2 |

*Primary Examiner*—Leo B. Tentoni
*Attorney, Agent, or Firm*—Leander F. Aulisio

[57] ABSTRACT

A process for the rapid precipitation polymerization of acrylonitrile and a minor amount of a vinyl carboxylic acid comonomer in an environment of less than 10 ppm metal-ions to produce an acrylonitrile copolymer which, when pyrolyzed in an oxidizing atmosphere, produces a high quality carbon fiber.

3 Claims, No Drawings

PROCESS OF MAKING POLYACRYLONITRILE FIBERS

BACKGROUND OF THE INVENTION

The present invention relates to a process for producing an acrylonitrile copolymer which is a precursor in the production of high quality carbon fibers. More specifically the invention relates to a process for producing acrylonitrile copolymer in an environment of less than 10 ppm of metal ions. The copolymer so produced is readily spun into fibers and then thermally converted into carbon fibers.

Carbon fibers prepared from acrylonitrile polymers and copolymers by a rapid oxidation process have superior physical properties such as increased tensile strength. The fibers are useful as reinforcement materials in automobile, aerospace, recreational and various other industries. An increasing demand for strong, lightweight materials insures an expanded use of carbon fibers in the future. Thus a need exists for a process which insures that the starting materials for producing carbon fibers are of the finest quality. A fine quality acrylonitrile polymer or copolymer has no defects such as voids formed when gases are expelled during fiber preparation. Also the fiber should not contain more than traces of metal contaminants, as these tend to degrade the fiber. The fiber should have a round shape for maximum stiffness.

Carbon fibers, which have heretofore been used as reinforcing material for plastic composite compositions, are preferably characterized by high tensile strength, high rigidity and a homogeneous fibrous structure. These characteristics can be adversely affected by certain properties found in the acrylonitrile copolymer feedstocks. If these undesirable properties can be identified and removed, then the final carbon fiber product is greatly enhanced in desirable characteristics.

U.S. Pat. No. 4,062,857 (Kobashi et al) discloses a process for preparing an acrylonitrile polymer in a substantially melted state. The polymerization, which is conducted under pressure, produces a polymer of uniform molecular weight with very little by-product. The patent does not exclude the use of vinyl sulfonic acid as a comonomer (Col. 2, line 65).

U.S. Pat. No. 4,049,605 (Kobashi et al) discloses a process for preparing an acrylonitrile polymer in a substantially molten state. The polymerization is conducted under increased pressure and in the presence of a catalyst such as a peroxide. The patent does not exclude the use of vinyl sulfonic acid or salts thereof as a comonomer (Col. 3, line 26).

U.S. Pat. No. 3,917,776 (Sato et al) discloses a process for producing a high quality carbon fiber. The feedstock can comprise an acrylonitrile copolymer containing units of acrylic acid, methacrylic acid or itaconic acid. Substantial amounts of a metal-containing catalyst are employed (claim 1).

The above-listed patents are incorporated herein by reference.

The process disclosed herein provides for the formation of acrylonitrile copolymer fibers having highest quality properties such as freedom from harmful sulfonic acid residues, freedom from more than 10 ppm metal ion contaminants freedom from voids, freedom from strong acids, suitably high molecular weight and increased stiffness.

SUMMARY OF THE INVENTION

Accordingly, an object of the present invention is to provide a process for rapidly and economically producing a high quality acrylonitrile copolymer which can be directly provided to a spinning operation and then to pyrolysis to obtain an improved carbon fiber product.

It is another object of the present invention to provide a product comprising an acrylonitrile copolymer which is substantially free of metal ions and sulfonic acid groups.

It is a further object of the present invention to provide an improved carbon fiber product prepared from the metal ion-free, sulfonic acid group-free acrylonitrile copolymer.

These and other objects have now herein been attained by a precipitation polymerization process comprising maintaining in a reaction zone a solvent system comprising water and an organic solvent capable of dissolving acrylonitrile copolymer, but in ratios such that the polymer is in the form of a slurry. A vinyl sulfonic acid comonomer-free feedstock is then added to the reaction zone. The feedstock comprises a major amount of acrylonitrile monomer and minor amount of a vinyl carboxylic acid monomer. Then an initiator system comprising a peroxide and an organic mercaptan and 2 ppm of an iron catalyst is added to the reaction zone. The mixture of solvent system, comonomers and initiators is then subjected to suitable conditions of temperature and pressure to obtain a suspension of acrylonitrile copolymer. The copolymer has improved physicals which results, upon pyrolysis, in a high quality carbon fiber product.

After polymerization is complete, water and excess monomer are removed as by stripping and then appropriate amounts of solvent are added to give a spinnable solution of acrylonitrile copolymer. The solution is subjected to wet spinning to provide round fibers. There is no need to purify the polymer solution prior to spinning.

DETAILED DESCRIPTION OF THE INVENTION

The process of the present invention provides for acrylonitrile copolymer fibers which are excellent starting materials for preparing carbon fibers. The process includes a very rapid precipitation polymerization which gives a product having a good molecular weight. In a preferred embodiment, the copolymer prepared from precipitation polymerization has a molecular weight of about 40,000 to about 100,000 no. average molecular weight. The polymerization is allowed to continue until the polymer mix contains 20% to 40% solids. Preferably, the intrinsic viscosity of the final polymer is about 1.1 to 1.7.

By precipitation polymerization is meant a polymerization process wherein the growing polymer comes out of solution at a certain stage, usually when about ten monomer units have been polymerized to form a polymer chain. Once out of solution, the polymer is unaffected by initiators and the like which tend to chain-stop the polymer. Monomer is able to penetrate the polymer and allows for the rapid continued growth of the polymer chain to a high molecular weight. Since the polymer growth is rapid, precipitation polymerization can be conducted in a continuous manner.

The solvent system used in the precipitation polymerization preferably comprises water and at least one other organic solvent. The organic solvent or solvents must be capable of dissolving acrylonitrile copolymer of a molecular weight as described above. In a preferred embodiment, the organic solvent is a member selected from the group consisting of dimethylformamide, dimethyl acetamide, dimethyl sulfoxide, tetramethylene cyclic sulfone and butyrolactone. The organic solvent or solvents can be present in the aqueous solvent system in an amount of from about 30% by volume to about 90% by volume. It has been found that the polymerization rate of the comonomers is dramatically increased when the water plus the solvent does not completely dissolve the copolymer. In a preferred embodiment, a solvent system comprising dimethylformamide (DMF) and water is employed, but dimethyl sulfoxide and water are also good. It has been observed that the itaconic acid mixture prevents formation of voids when neutralized and the fibers are formed from wet spinning. Precipitation polymerization is at least ten times faster than solution polymerization.

The organic solvent which is selected for mixture with water to form a solvent system for solution polymerization must be free from metals and metal ions. Examples of solvents not suitable for the practice of the present invention are sodium thiocyanate and zinc chloride.

The feedstock for the precipitation polymerization comprises a major amount of acrylonitrile monomer and a minor amount of a vinyl carboxylic acid comonomer. In a preferred embodiment, the acrylonitrile monomer is present in the feedstock in an amount from about 85% by weight to about 99% by weight. In a most preferred embodiment, the acrylonitrile monomer is present in an amount from about 92% by weight to about 98% by weight.

The vinyl carboxylic acid comonomer is a member selected from the group consisting of itaconic acid, acrylic acid and methacrylic acid. It is within the scope of the present process to use more than one comonomer. In addition to carboxylic acid-containing comonomers, other olefinic monomers can also be present. The only restriction imposed on the present process is that a vinyl sulfonic acid comonomer, allyl sulfonic acid comonomer, salts thereof, and the like cannot be included in the feedstock compositions. It has been observed that the presence of sulfonic acid groups in the final acrylonitrile copolymer causes retention of metal ions. The feedstock for use in the present process must be substantially free of sulfonic acid groups. By substantially free of sulfonic acid groups is meant not more than 0.5 mole % sulfonic acid groups based on the polymer composition. Also, when sulfonic acid groups are replaced by carboxyl groups in the final acrylonitrile copolymer, the oxidation rate during carbon fiber preparation is increased.

The precipitation polymerization of acrylonitrile monomer and suitable comonomers is enhanced by the presence of an initiator system comprising a peroxide and a low molecular weight volatile organic mercaptan. The organic mercaptan should have low volatility. The initiator system cannot contain any metal or metal ion-containing compounds greater than 10 ppm. The peroxide is a member selected from the group consisting of hydrogen peroxide, t-butyl hydroperoxide, t-butyl peroxide and lauroyl peroxide. The mercaptan is a member selected from the group consisting of 1-thioglycerol, mercapto ethanol and butyl mercaptan isomers. By butyl mercaptan isomers is meant normal butyl mercaptan, sec-butyl mercaptan and iso-butyl mercaptan. By low molecular weight organic mercaptan is meant a $C_1$-$C_6$ organic mercaptan.

A catalytic amount of an iron compound is added to the mixture of solvent, initiator and monomer systems. Examples of iron catalysts are ferric (or ferrous) nitrate, ferric (or ferrous) chloride, and ferric (or ferrous) ammonium sulfate. The compounds can have water of hydration associated therewith.

An acrylonitrile copolymer is prepared by reacting the mixture of monomers, solvents and initiators under suitable conditions of temperature and pressure. In a preferred embodiment, the reaction is conducted at a temperature of about 50° C. to about 70° C.; and at a pressure of about 1.0 atmospheres to about 1.2 atmospheres. As the polymerization continues, feedstock, solvent and initiator can be added either in a continuous fashion or at regular intervals to maintain correct amounts of reactants and the like in accordance with parameters well-known to those skilled in the art. As was noted earlier, preferably the polymerization is continued until the solids content reaches about 20% to about 40%. The precipitation polymerization provides for a rapid rate of conversion and a high molecular weight product.

The present process is best used in a continuous precipitation polymerization which allows good dissipation of the heat of polymerization and allows reaction times as short as 30-60 minutes. Current solution polymerization requires 17-24 hours; attempts to speed solution polymerizations result in unusually low molecular weight polymer.

Once the polymerization is completed, the water and unreacted acrylonitrile are removed as by stripping, and the acrylonitrile copolymer dissolves in the organic solvent. Additional organic solvent is added to adjust solids to the proper viscosity. The usual steps of isolating the copolymer, washing, drying, grinding, and dissolving prior to spinning are not performed. Rather the dissolved copolymer is directly converted into fibers by wet spinning to obtain high quality round fibers suitable for preparing carbon fibers as by oxidative pyrolysis.

In a preferred embodiment, precipitation polymerization is conducted continuously in a vertical reactor column. Monomer is added at the top of the column and polymer is withdrawn from the bottom of the column. At the top of the column a cloudy suspension of polymer is observed, and at the bottom of the column a clear solution of polymer is observed. As water and monomer are continuously drawn off, the polymer becomes increasingly soluble in the solvent mixture as the charge advances toward the bottom of the vertical reactor column.

Another feature of the present process is the addition of a specific type of oxidation catalyst to the acrylonitrile copolymer prior to carbonization. The oxidation catalyst must be free of metal or metal ions. The oxidation catalyst is a member selected from the group consisting of ammonia and low molecular weight amines. By low molecular weight amines is meant a $C_1$-$C_6$ aliphatic amine. The oxidation catalyst can be added to the acrylonitrile copolymer either before the wet spinning operation or after wet spinning.

The process for converting oxidation catalyst-containing acrylonitrile copolymer fibers into high quality carbon fibers can be selected from any one of the well-known processes for carbonization. The carbonization process as such forms no part of the present invention.

The presence of the ammonia or amine catalyst allows for an increase in fiber density to above 1.30 in the oxidation process which is completed in a time of about six minutes. Now it is ready for the carbonization step. Void formation in the fibers is prevented by the use of amine catalysts. Other advantages of using the amine catalysts are improved heat dissipation and absence of particulate residues. Carbon fibers obtained from acrylonitrile copolymer fibers prepared according to the present process have excellent properties.

The present invention will be explained in further detail by way of example, but the scope of the invention is not limited by the example. In the example, parts and percentages are by weight unless otherwise specified.

EXAMPLE

A jacketed aluminum reactor is charged with a solvent mixture of dimethylformamide and water in a ratio of about 80:20 by volume and in an amount of 0.6 liters. An acrylonitrile monomer and an itaconic acid monomer is added to the reactor in a ratio of about 95:5 by weight and in an amount of 400 grams. Hydrogen peroxide in an amount of about 0.5% based on total monomer weight is then added to the reactor. 1-Thioglycerol is added to the reactor in an amount of about 0.3% based on total monomer weight. Ferrous Ammonium Sulfate Hydrate is added to the reactor in an amount of about 10 ppm based on total reagents.

The slurry or precipitation polymerization is conducted in the aluminum reactor at a temperature of about 50° C. and a pressure of about 1.0 atmospheres. Polymerization is continued until the solids content reaches about 25% to 30% solids (about 1 hour). After polymerization is completed, a vacuum stripping system is employed to remove water and unreacted monomer. The stripping operation yields a direct spin dope without isolation of polymer. To reduce the solids to 30%, add 220 grams of DMF. Ammonia is then added to the spin dope in an amount of 6 grams with thorough mixing. The solution of polymer and oxidation catalyst (ammonia) is then subjected to a wet spinning operation to obtain catalyst-containing acrylonitrile copolymer fibers.

Many equivalent modifications will be apparent from a reading of the above to those skilled in the art without a departure from the inventive concept which is limited and defined only by the appended claims.

We claim:

1. A process for preparing acrylonitrile fibers comprising:
    maintaining in a reaction zone a substantially metal-ion free solvent system comprising water and an organic solvent capable of dissolving acrylonitrile copolymer,
    adding to the reaction zone a vinyl sulfonic acid comonomer-free feedstock comprising a major amount of acrylonitrile monomer and a minor amount of a vinyl carboxylic acid comonomer,
    adding to the reaction zone an initiator system comprising a peroxide, a low molecular weight organic mercaptan, and a catalytic amount of metal ion,
    polymerizing the acrylonitrile monomer and vinyl carboxylic acid monomer under suitable precipitation polymerization conditions of temperature and pressure to obtain an acrylonitrile copolymer,
    stripping off water and excess monomer and comonomer to obtain a spinnable solution of acrylonitrile copolymer, and
    wet spinning the solution to produce round fibers.

2. A process consisting of adding to the fibers of claim 1 an oxidation catalysts which is a member selected from the group consisting of ammonia and low molecular weight amines.

3. A process according to claim 2 wherein the addition of oxidation catalyst is performed prior to wet spinning.

* * * * *